United States Patent Office 2,788,365
Patented Apr. 9, 1957

2,788,365

QUATERNARY AMMONIUM SALTS OF DIALKYL-AMINOALKYL ESTERS OF 9,10-DIHYDROAN-THRACENE-9-CARBOXYLIC ACID AND THE PREPARATION THEREOF

John W. Cusic, Skokie, and Richard A. Robinson, Morton Grove, Ill., assignors, by mesne assignments, to G. D. Searle & Co., Skokie, Ill., a corporation of Delaware No Drawing. Application January 15, 1953, Serial No. 331,512

7 Claims. (Cl. 260—469)

This invention relates to quaternary ammonium salts of dialkylaminoalkyl esters of 9,10-dihydroanthracene-9-carboxylic acid and to the preparation thereof. In particular this invention relates to compounds of the following general structural formula

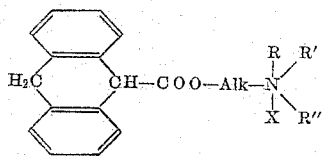

wherein Alk is a lower alkylene radical containing at least 2 and not more than 4 carbon atoms, and in which R, R', and R'' are lower alkyl radicals containing not more than 4 carbon atoms and in which X is one equivalent of an anion.

In the compounds of the foregoing formula Alk represents alkylene radicals such as ethylene, propylene, butylene, trimethylene, tetramethylene, and like bivalent radicals derived from saturated aliphatic hydrocarbons containing 2 to 4 carbon atoms. The radicals R, R' and R'' represent such lower alkyl radicals as methyl, ethyl, propyl, isopropyl, butyl, isobutyl, and secondary butyl. The substituent X represents one equivalent of an anion and includes such non-toxic anions as chloride, bromide, iodide, methyl sulfate, ethyl sulfate, benzenesulfonate, toluenesulfonate, tartrate, succinate, malate, acetate, citrate, nitrate, sulfate, phosphate, sulfamate, and the like.

The compounds of this invention as described above are useful in medicine as anticholinergic agents. They have the property of blocking or inhibiting the transmission of nerve impulses across ganglia, parasympathetic myoneural junctions and skeletal myoneural junctions. These compounds are generally soluble in water and aqueous solutions of alcohols and other water-soluble organic solvents. They may be administered in the form of aqueous solutions or in solid form as tablets or capsules.

The quaternary ammonium salts which comprise this invention are conveniently prepared by reacting a basic ester of the formula

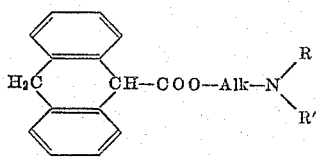

wherein Alk, R and R' have the meanings given hereinabove with an alkyl ester of the formula

R''—X' wherein R'' has the meaning given hereinabove and X' represents halogen, alkyl sulfate, or arylsulfonate radicals. These reactions are preferably carried out at elevated temperatures in the range of 50–150° C. in inert solvents such as acetone, methyl ethyl ketone, methanol, ethanol, isopropanol, chloroform, or nitromethane. Lower temperatures between 0° and 50° C. are also satisfactory. Generally the reactions are carried out in a closed system if a lower alkyl halide is used as one of the reagents. With higher boiling reagents the reactions may be carried out in open systems at reflux temperature. In most instances the quaternary ammonium salt crystallizes from the cooled reaction mixture and may be isolated by filtration. In some instances it may be necessary to precipitate the salt by the addition of a solvent such as ether or a low boiling hydrocarbon in order to lower the solubility of the salts in the reaction mixture. The salt may be further purified by recrystallization from suitable solvents.

In the event that salts are desired in which the anion represented by X is different from the anion represented by X', the anion may be interchanged by reaction of the quaternary ammonium salt with a heavy metal salt of an acid providing the appropriate anion. For example halide ions may be replaced by tartrate ions by reaction with silver tartrate. Likewise citrate, nitrate, malate and other ions described above can be introduced by use of silver citrate, silver nitrate, lead malate and similar salts. These reactions are carried out by agitating the reagents in aqueous solvents such as dilute alcohol or dilute acetone. The heavy metal salts are then removed by filtration and the quaternary ammonium salts are isolated by evaporation of the filtrate.

Our invention is disclosed in further detail by the following examples which are representative of methods of preparing the compounds within the scope of this invention but which are not to be construed as limiting the invention in spirit or in scope. Relative amounts of materials are given in parts by weight and temperatures are recorded in degrees centigrade (° C.).

The present application is a continuation-in-part of our abandoned copending application Serial No. 136,854, filed January 4, 1950, which is a continuation-in-part of our abandoned copending application Serial No. 80,562, filed March 9, 1949.

*Example 1*

28 parts of 9,10-dihydroanthracene-9-carboxylic acid in 390 parts of isopropanol in which had previously been dissolved 3 parts of metallic sodium are reacted with 16 parts of β-dimethylaminoethyl chloride at reflux temperature for three hours. The solution is filtered, stripped of solvent, and the resulting β-dimethylaminoethyl 9,10-dihydroanthracene-9-carboxylate is used in the next step.

15 parts of the above base and 7.5 parts of methyl chloride in 40 parts of anhydrous acetone are reacted at room temperature for 30 hours. The crystalline precipitate of β-dimethylaminoethyl 9,10 - dihydroanthracene - 9 - carboxylate methochloride is separated, washed with dry acetone, and dried. It melts at about 206° C.

*Example 2*

To an ethereal solution of 15 parts of β-diethylaminoethyl 9,10-dihydroanthracene-9-carboxylate are added an excess of methyl iodide. The reaction mixture is kept for several days at 0° C. The precipitate of the methiodide is separated by decantation, dissolved in isopropanol, treated with decolorizing charcoal and filtered. On chilling a partially oily precipitate of the methiodide forms. This is redissolved in isopropanol and precipitated with dry ether. The crystalline methiodide thus forms and melts at 159–160° C.

*Example 3*

A solution of 21 parts of β-diethylaminopropyl 9,10-dihydroanthracene-9-carboxylate and 14 parts of ethyl bromide in 50 parts of methyl ethyl ketone is kept at 60° C. in a closed vessel for 9 hours. The solvent is then removed by evaporation and the residue of the β-diethylaminopropyl 9,10-dihydroanthracene-9-carboxylate ethobromide is triturated with cold dry ether and dried. This salt has the formula

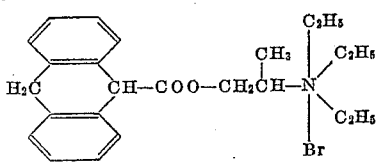

*Example 4*

A solution of 20 parts of β-diethylaminoethyl 9,10-dihydroanthracene-9-carboxylate and 12 parts of methyl bromide in 40 parts of methyl ethyl ketone is kept at room temperature for 15 hours. The precipitate is removed and recrystallized from isopropanol. β-diethylaminoethyl 9,10 - dihydroanthracene-9-carboxylate methobromide melts at 161–162° C. and has the formula

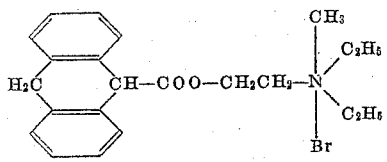

*Example 5*

A solution of 24 parts of β-diethylaminoethyl 9,10-dihydroanthracene-9-carboxylate and 23 parts of ethyl bromide in 60 parts of cholorform is kept at 80° C. for 15 hours in a closed vessel. The solvent is evaporated and the residue chilled and treated with ether. Crystals of the quaternary ammonium salt soon form. They are separated and recrystallized from a mixture of isopropanol and ethyl acetate. β-diethylaminoethyl 9,10-dihydroanthracene-9-carboxylate ethobromide melts at 172–173° C.

We claim:
1. A quaternary ammonium salt of the formula

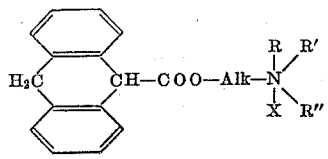

wherein Alk is an alkylene radical containing at least 2 and not more than 4 carbon atoms; R, R' and R'' are alkyl radicals containing not more than 4 carbon atoms; and X is one equivalent of an anion.

2. A quaternary ammonium salt of the formula

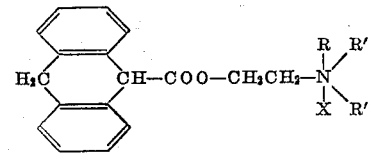

wherein R, R' and R'' are alkyl radicals containing not more than 4 carbon atoms; and X is one equivalent of an anion.

3. A quaternary ammonium salt as in claim 2 wherein X is a halogen.

4. A β-dimethylaminoethyl 9,10-dihydroanthracene-9-carboxylate methohalide.

5. A β-diethylaminoethyl 9,10 - dihydroanthracene-9-carboxylate methohalide.

6. β-dimethylaminoethyl 9,10 - dihydroanthracene - 9-carboxylate methochloride.

7. β-diethylaminoethyl 9,10 - dihydroanthracene-9-carboxylate methiodide.

References Cited in the file of this patent

UNITED STATES PATENTS

| | | |
|---|---|---|
| 2,316,051 | Cusic et al. | Apr. 6, 1943 |
| 2,399,736 | Holmes et al. | May 7, 1946 |

FOREIGN PATENTS

| | | |
|---|---|---|
| 680,925 | Great Britain | Oct. 15, 1952 |

OTHER REFERENCES

Jensen et al.: Acta Chemica Scandinavia 2, 381–383 (1948).

Larsson et al.: Chem. Abs. 42, 676 (1948).

"New and Nonofficial Remedies," J. B. Lippincott Co., 1948, pp. 250–255.